UNITED STATES PATENT OFFICE.

ANSON GARDNER BETTS, OF TROY, NEW YORK.

ACID-PROOF TANK FOR THE ELECTROLYTIC REFINING OF METALS.

No. 918,649. Specification of Letters Patent. Patented April 20, 1909.

Application filed December 6, 1906. Serial No. 346,678.

*To all whom it may concern:*

Be it known that I, ANSON GARDNER BETTS, a citizen of the United States, residing at Troy, in the county of Rensselaer and State of New York, have invented certain new and useful Improvements in Acid-Proof Tanks for the Electrolytic Refining of Metals.

This invention relates to the use of porous mineral substances saturated with an inert filling material especially sulfur, in the construction of electrolytic tanks.

The object of the invention is to provide a comparatively cheap and useful tank for electrochemical work, particularly for electrolytic lead refining.

The tank is preferably constructed as follows: A tank is first made of concrete or cement in the usual manner and the same may be reinforced if desired, particularly for large tanks. After the concrete or cement is well set, the tank is dried and then submerged in a large pot containing melted sulfur, best near the melting point. Great volumes of steam come off as the tank warms up and all air in the pores of the tank is quickly removed thereby. I then gradually raise the temperature for a number of hours, say twelve hours, for a tank with four-inch to six-inch walls to a maximum temperature of say 155° C., or any higher temperature desired. After the evolution of steam at the maximum temperature has practically ceased, the sulfur is slowly cooled to near the melting point again during a number of hours. The reabsorption of the steam remaining in the pores, or its contraction, produces a vacuum into which the sulfur flows, filling the pores at least near the surface, where a filling is most desired. The tank is then taken out, cooled to a little below the melting point of sulfur, and lined with sulfur as follows: The tank is placed flat on its respective sides, ends and bottom and a thin layer of sulfur poured on and allowed to solidify, thereby providing a lining of sulfur. The concrete or cement so treated, but without this lining resists acids excellently, but the said sulfur lining adheres so well and a further protection is afforded so easily, that I prefer to use it.

If melted sulfur is plastered onto a concrete surface, which has not been previously specially treated, it soon cracks off. The sulfur lining is itself somewhat porous on account of the contraction that takes place when sulfur solidifies. Furthermore, sulfur is not absolutely insoluble in water and acids, and the continual presence of traces of sulfur in the electrolytes is not desirable, so I apply further a coat of suitable paint, or varnish or paraffin to the sulfur surface. In case the sulfur lining is omitted, I apply said paint, etc., directly to the sides of the tank. Melted paraffin is excellent for this purpose if the solutions to be used in the tank are not heated, and only a small amount of paraffin is required.

Before using the tank it should have a lining of boards to protect it from any injury that might be received from pieces of metal dropping or swinging in the tank.

My tank is so solid that the great brittleness of sulfur which causes it to break when there is the slightest "give," is no objection to its use.

To make a good exterior, non-absorbent finish on the outside, it may be treated in a similar manner or quickly dipped in melted sulfur, when a smooth, hard layer of sulfur is produced on the surface. Such a tank is non-absorbent and practically proof against dilute acids, even hydrofluoric acid.

I do not desire to be limited to the use of cement or concrete alone. Porous earthenware vessels may be treated in a similar manner, or brick may be made non-absorbent and acid proof.

As an example of the use of brick or separate pieces of porous substances which may be used in tank construction, the brick may first be saturated with sulfur in a pot and then laid up with a plastic mortar of solid material as kaolin, mixed with melted sulfur. I have also applied the sulfur by placing sulfur in a tank and heating it by lighting the sulfur and letting some of it burn, or otherwise heating it, but regard the method of heating in a vat of sulfur as more suitable except for very large tanks, when the method for filling the tank with melted sulfur is better.

Various suitable methods of heating the sulfur, pumping it to and from storage tanks, etc., will suggest themselves to anyone skilled in the art.

I have also used a solution of sulfur in carbon bisulfid instead of melted sulfur, but this is a more expensive and an inferior method.

What I claim as new and desire to secure by Letters Patent, is:

1. A tank for metal depositing, consisting of material containing cement, with solidified sulfur in the pores thereof.

2. A tank for metal depositing, consisting of concrete or cement, with solidified sulfur in the pores of the interior surface layer.

3. A tank for metal depositing, consisting of concrete or cement with solidified sulfur in the pores of the interior surface layer, and an interior lining of sulfur.

4. A tank for metal depositing, made of a cement mixture with solidified sulfur in the pores thereof near the inside surface, and a superposed coating of inert material on the inside.

5. A tank for metal depositing of porous, inorganic substance with the pores of the interior surface layer practically filled with sulfur.

6. A tank for metal depositing, consisting of porous inorganic substance with the pores of the interior surface layer practically filled with an inert fusible substance.

7. A tank for metal depositing, consisting of porous inorganic substance with the pores of the interior surface layer protected by sulfur, and further protected with another material inert to the electrolyte, capable of application as a liquid.

8. A tank for metal depositing, consisting of solidified cement mixture, protected interiorly with sulfur, and further protected by a superposed layer of another material inert to the electrolyte, capable of application in liquid form.

In testimony whereof, I have hereunto signed my name in the presence of the subscribing witnesses.

ANSON GARDNER BETTS.

Witnesses:
 BEN. STARBUCK,
 RALPH H. SHERRY.